US011649020B2

(12) United States Patent
Kim (10) Patent No.: US 11,649,020 B2
(45) Date of Patent: May 16, 2023

(54) FENDER DAVIT DEVICE

(71) Applicant: SAMSUNG HEAVY IND. CO., LTD., Seongnam-si (KR)

(72) Inventor: Sang-Whee Kim, Geoje-si (KR)

(73) Assignee: SAMSUNG HEAVY IND. CO., LTD., Seongnam-si (KR)

( * ) Notice: Subject to any disclaimer, the term of this patent is extended or adjusted under 35 U.S.C. 154(b) by 424 days.

(21) Appl. No.: 16/757,890

(22) PCT Filed: Nov. 12, 2018

(86) PCT No.: PCT/KR2018/013728
§ 371 (c)(1),
(2) Date: Apr. 21, 2020

(87) PCT Pub. No.: WO2019/093844
PCT Pub. Date: May 16, 2019

(65) Prior Publication Data
US 2020/0339233 A1 Oct. 29, 2020

(30) Foreign Application Priority Data

Nov. 13, 2017 (KR) .................. 10-2017-0150758
Nov. 9, 2018 (KR) .................. 10-2018-0137517

(51) Int. Cl.
*B63B 59/02* (2006.01)
*B66D 1/50* (2006.01)
*B66D 1/74* (2006.01)

(52) U.S. Cl.
CPC ............... *B63B 59/02* (2013.01); *B66D 1/50* (2013.01); *B66D 1/7489* (2013.01)

(58) Field of Classification Search
CPC .......... B63B 59/02; B66D 1/50; B66D 1/7489
See application file for complete search history.

(56) References Cited

U.S. PATENT DOCUMENTS 8,567,335 B2 * 10/2013 Johnson, III ............ B63B 27/08
114/268
2015/0325099 A1 * 11/2015 Sakakibara ............. B63B 59/02
340/668
2020/0339233 A1 * 10/2020 Kim ......................... B66D 1/50

FOREIGN PATENT DOCUMENTS

CN   101057042 A   10/2007
CN   101746686 A   6/2010
(Continued)

OTHER PUBLICATIONS

International Search Report and Written Opinion dated Feb. 14, 2019 in International Application No. PCT/KR2018/013728, in 10 pages (English translation of Search Report in 2 pages).
(Continued)

*Primary Examiner* — S. Joseph Morano
*Assistant Examiner* — Jovon E Hayes
(74) *Attorney, Agent, or Firm* — Knobbe, Martens, Olson & Bear, LLP (57) ABSTRACT

A fender davit device is disclosed. The fender davit device in accordance with an aspect of the present disclosure includes a fender and a davit comprising a hauling line holding the fender and a winch configured to move the fender by winding or unwinding the hauling line. The fender davit device also includes a hauling line tension maintaining part configured to maintain a tension of the hauling line holding the fender to prevent the hauling line from breaking.

7 Claims, 10 Drawing Sheets

(56) References Cited

FOREIGN PATENT DOCUMENTS

| | | | |
|---|---|---|---|
| CN | 203497146 U | 3/2014 | |
| JP | S61-277561 A | 12/1986 | |
| KR | 10-2009-0023929 A | 3/2009 | |
| KR | 10-2011-0092004 A | 8/2011 | |
| KR | 20110092004 A * | 8/2011 | ............. B63B 59/02 |
| KR | 10-2015-0115825 A | 10/2015 | |
| KR | 10-2015-0117795 A | 10/2015 | |
| KR | 101672334 B1 * | 4/2016 | ............. B63B 59/02 |
| KR | 10-1636543 B1 | 7/2016 | |
| KR | 10-1672334 81 | 11/2016 | |
| KR | 20200053961 A * | 5/2020 | ............. B63B 59/02 |
| WO | 2004/113206 A2 | 12/2003 | |

OTHER PUBLICATIONS

Office Action dated Sep. 17, 2021 for couterpart CN Patent Application No. 201880072110.5.

Office Action dated Dec. 23, 2020 for counterpart KR Patent Application No. 10-2018-0137517.

* cited by examiner

FENDER DAVIT DEVICE

The present application is a U.S. national phase application under 35 U.S.C. § 371 of International Application No. PCT/KR2018/013728, filed on Nov. 12, 2018, which claims the benefit of Korean Patent Applications Nos. 10-2018-0137517 and 10-2017-0150758 filed on Nov. 9, 2018 and Nov. 13, 2017, respectively, in the Korean Intellectual Property Office, the entire disclosure of each of which is incorporated herein by for all purposes.

TECHNICAL FIELD

The present disclosure is related to a fender davit device.

BACKGROUND

Marine structures, such as vessels, are afloat on the sea and thus are rolled by the flow of seawater. When a marine structure is moored near another marine structure, a fender is installed in between these marine structures in order to prevent a damage in the hull caused by a contact between these adjacent marine structures.

Figure 1:
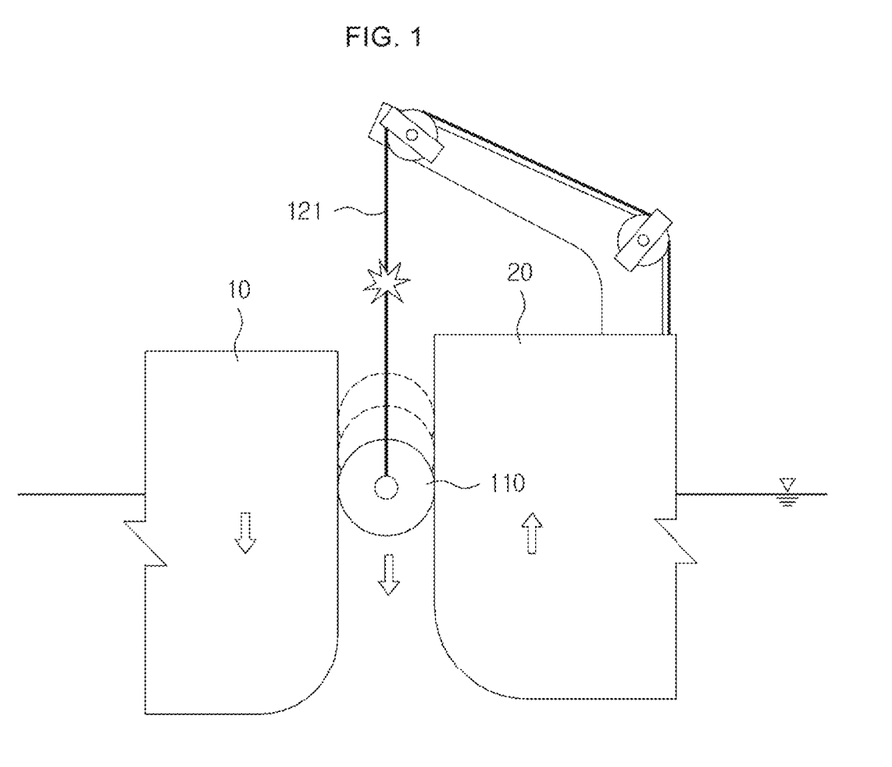
FIG. 1 shows a pair of marine structures mooring in the sea.

In such a case, these adjacent marine structures may be rolled differently, often causing a break in a hauling line, which holds the fender, as shown in FIG. 1, Accordingly, a new device needs to be developed to prevent such a damage.

SUMMARY

Embodiments of the present disclosure provide a fender davit device that can prevent a hauling line, which holds a fender, from breaking, tangling, etc.

An aspect of the present disclosure provides a fender davit device that comprises a fender, a davit configured by comprising a hauling line holding the fender and a winch configured to move the fender by winding or unwinding the hauling line, and a hauling line tension maintaining part configured to maintain a tension of the hauling line holding the fender to prevent the hauling line from breaking.

Here, the hauling line tension maintaining part may comprise a first idle pulley wound at an intermediate portion of the hauling line between the fender and the winch and a tensioner connected to the first idle pulley to pull the first idle pulley downwardly with a predetermined strength.

Here, the tensioner may comprise a rope being connected to the first idle pulley, a roller having the rope wound thereon, a stationary axle penetrating in the roller, and a spring being arranged between the stationary axle and the roller.

Moreover, the hauling line tension maintaining part may further comprise a slider configured to guide a movement of the first idle pulley.

Moreover, the davit may comprise a first fixed pulley and a second fixed pulley, and the first idle pulley may be positioned between the first fixed pulley and the second fixed pulley.

Moreover, the hauling line tension maintaining part may comprise a first idle pulley wound at an intermediate portion of the hauling line between the fender and the winch, a sheave block having the first idle pulley installed therein, a slider configured to guide the sheave block to move upward and downward relative to the davit, and a sheave block weight detachably installed in the sheave block and configured to adjust a weight of the sheave block corresponding to a load applied to the hauling line.

The davit may have a first fixed pulley, a second fixed pulley, and a third fixed pulley installed therein. Here, the hauling line tension maintaining part may further comprise a second idle pulley installed in the sheave block so as to be wound at an intermediate portion of the hauling line. The first idle pulley may be configured to change a direction of the hauling line wound on the first fixed pulley and the second fixed pulley, and the second idle pulley may be configured to change a direction of the hauling line wound on the second fixed pulley and the third fixed pulley.

With the fender davit device according to embodiments of the present disclosure, the breaking, tangling, etc, of the hauling line may be prevented by adjusting the length and tension of the fender-holding hauling line to be maintained within a predetermined range.

DETAILED DESCRIPTION

Since there can be a variety of permutations and embodiments of the present disclosure, certain embodiments will be illustrated and described with reference to the accompanying drawings. This, however, is by no means to restrict the present disclosure to certain embodiments, and shall be construed as including all permutations, equivalents and substitutes covered by the ideas and scope of the present disclosure. Throughout the description of the present disclosure, when describing a certain relevant conventional technology is determined to evade the point of the present disclosure, the pertinent detailed description will be omitted.

Hereinafter, some embodiments will be described in detail with reference to the accompanying drawings. Identical or corresponding elements will be given the same reference numerals, regardless of the figure number, and any redundant description of the identical or corresponding elements will not be repeated.

FIG. 1 shows a pair of marine structures mooring in the sea.

As shown in FIG. 1, in a situation where, for example, a marine structure 10 located on the left side descends while a marine structure 20 on the right side ascends, a fender 110 located in between the marine structures 10, 20 is applied with a downward force. in such a case, a large tensile force is exerted to a hauling line 121, Which holds the fender 110, a winch (not shown) needs to be driven to loosen the hauling line 121. However, since this kind of situation happens instantaneously, the hauling line 121 often breaks while the winch is driven.

Figure 2:
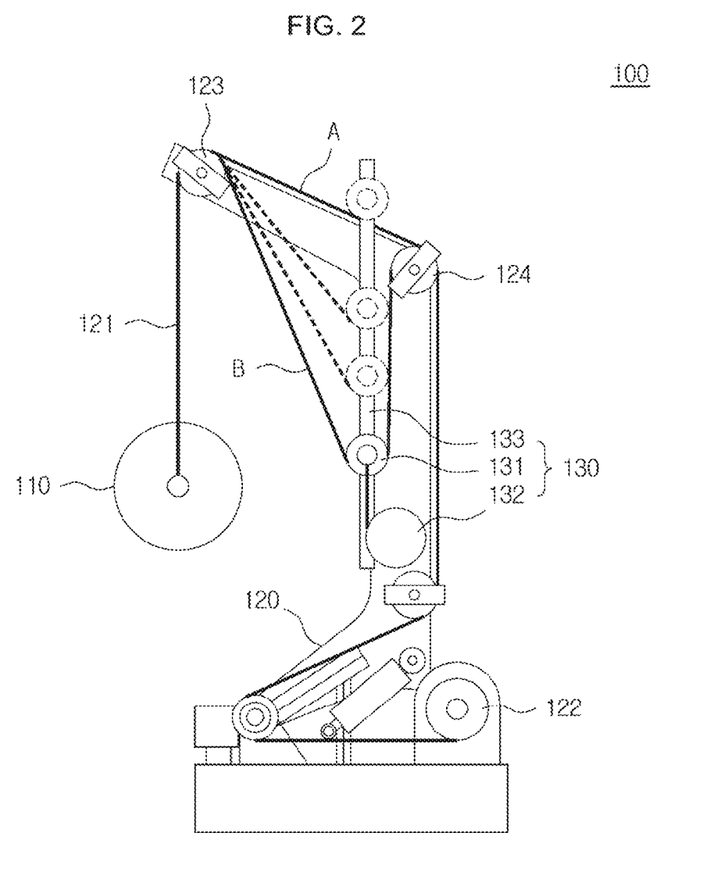
FIG. 2 shows a fender davit device in accordance with an embodiment of the present disclosure.
Figure 3:
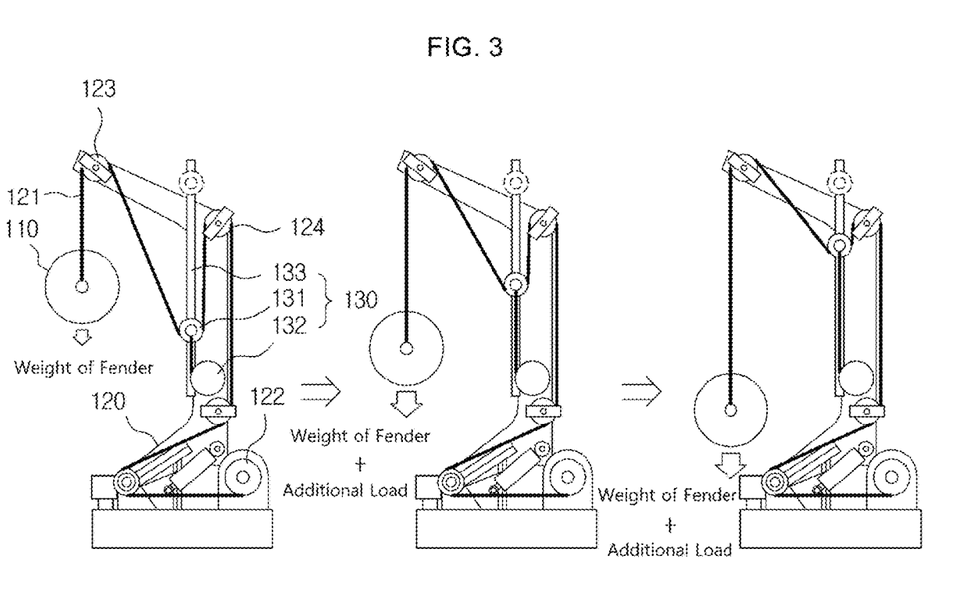
FIG. 3 illustrates how the fender davit device in accordance with an embodiment of the present disclosure works.

FIG. 2 shows a fender davit device in accordance with an embodiment of the present disclosure, and FIG. 3 illustrates how the fender davit device in accordance with an embodiment of the present disclosure works.

As shown in FIG. 2 and FIG. 3, a fender davit device 100 in accordance with an embodiment of the present disclosure includes fender 110, davit 120, and hauling line tension maintaining part 130.

Accordingly, the fender davit device 100 in accordance with the present embodiment may prevent the hauling line from breaking, by adjusting the length and tension of the hauling line holding the fender 110 to be maintained within a predetermined range through the hauling line tension maintaining part 130.

Specifically, the hauling line tension maintaining part 130 of the present embodiment includes a first idle pulley 131, which is freely movable, and a tensioner 132, which restricts the movement of the first idle pulley 131, and may further include a slider 133, which guides the movement of the first idle pulley 131.

As shown in FIG. 2, the first idle pulley 131 is a movable pulley and is installed to be reeled at an intermediate portion of the hauling line between the fender 110 and winch 122. In such a case, the first idle pulley 131 is positioned to push the hauling line downwardly from above the hauling line. Moreover, the tensioner 132 is installed in such a way that the first idle pulley 131 is pulled downwardly with a predetermined strength. Accordingly, the hauling line may be normally maintained in a V-shape (i.e., normal position B of the hauling line) despite the weight of the fender 110, as shown in FIG. 2.

In other words, while the hauling line has a shape that is pulled tightly by the weight of the fender 110 coupled to one end thereof and the winch 122 coupled to the other end thereof (i.e., initial position A of the hauling line), the hauling line may maintain the V-shape (i.e., normal position B of the hauling line), as shown in FIG. 2, because the first idle pulley 131 and the tensioner 132 of the present embodiment are downwardly holding the intermediate portion of the hauling line.

Here, the pulling force of the tensioner 132 may be additionally adjusted according to the weight of the fender 110 (which is normally about 10 tons). That is, if the fender 110 weighs significantly, the pulling force of the tensioner 132 may be increased corresponding to the weight of the fender 110, and if the fender 1 is relatively light, the pulling force of the tensioner 132 may be reduced corresponding to the weight of the fender 110.

The tensioner 132 may restrict the movement of the first idle pulley 131, and more specifically, perform a function of always returning the first idle pulley 131 to its initial position. That is, once the force (i.e., tension) exerted to the first idle pulley 131 via the fender 110 and the hauling line 121 is removed, the tensioner 132 may return the first idle pulley 131 to its initial position.

In an example, the tensioner 132 of the present embodiment may be a spring tensioner. Specifically, the spring tensioner may include a rope being connected to the first idle pulley 131, a roller being wound with the rope, a stationary axle penetrating in the roller (and being fixed to a surrounding structure), and a spring arranged between the stationary axle and the roller. Accordingly, a tension is built in the spring connecting the roller with the stationary axle while the rope is unwound from the roller, and once the force holding one end of the hauling line 121 is removed, the rope is rewound on the roller by the tension of the spring, returning the first idle pulley 131 to its initial position.

The slider 133 is configured to help the movable first idle pulley 131 for a stable movement, as shown in FIG. 2. Specifically, the slider 133 may be shaped with a frame extended in a longitudinal direction and a block sliding in a lengthwise direction of the frame. In such a case, the frame may have a rail or a slot formed in the longitudinal direction thereof such that the first idle pulley 131 may slide. The first idle pulley 131 may be mounted on the block to slide along the rail or slot in the longitudinal direction of the frame.

Here, the spring tensioner 132 is coupled to the block of the slider 133 and is hence configured such that the block integrally coupled with the first idle pulley 131 is always pulled downwardly by the spring tensioner 132.

Meanwhile, as shown in FIG. 2, the davit 120 may further include a first fixed pulley 123 and second fixed pulley 124 in addition to the hauling line 121 and the winch 122, as part of a crane for hauling the fender 110.

Unlike the first idle pulley 131 described above, the first and second fixed pulleys 123, 124 are fixed pulleys. That is, the first and second fixed pulleys 123, 124 are fixed to a body of the davit 120. Accordingly, while the hauling line is wound on the first and second fixed pulleys 123, 124 of the davit 120, the first idle pulley 131 is installed to be positioned between the first and second fixed pulleys 123, 124, as illustrated in FIG. 2.

Referring to FIG. 3, in a situation where, for example, the marine structure on the left side descends while the marine structure on the right side ascends, as shown in FIG. 1, the fender 110 in between these marine structures will be applied with a relatively stronger downward force, in which case an additional load is applied to the hauling line holding the fender 110 in addition to the weight of the fender 110. Accordingly, the fender davit device 100 of the present embodiment allows the tensile force exerted in the hauling line to be reduced by upwardly moving the first idle pulley 131 ding the hauling line along the slider 133.

Additionally, if, for example, the fender 110 is ascended by waves or a motion of the vessel while the fender 110 is positioned at the sea level, the tension in the hauling line may be lost (that is, the hauling line becomes loose). In such a case, the spring tensioner 132 of the hauling line tension maintaining part 130 may pull the first idle pulley 131 downwardly to tighten the loose hauling line. Accordingly, the loose hauling line may be kept from tangling.

Moreover, without having to drive the winch 122, as has been the case conventionally, by adjusting the length and tension of the hauling line within a predetermined range through the use of the hauling line tension maintaining part 130, the hauling line may be kept from breaking.

Figure 4:
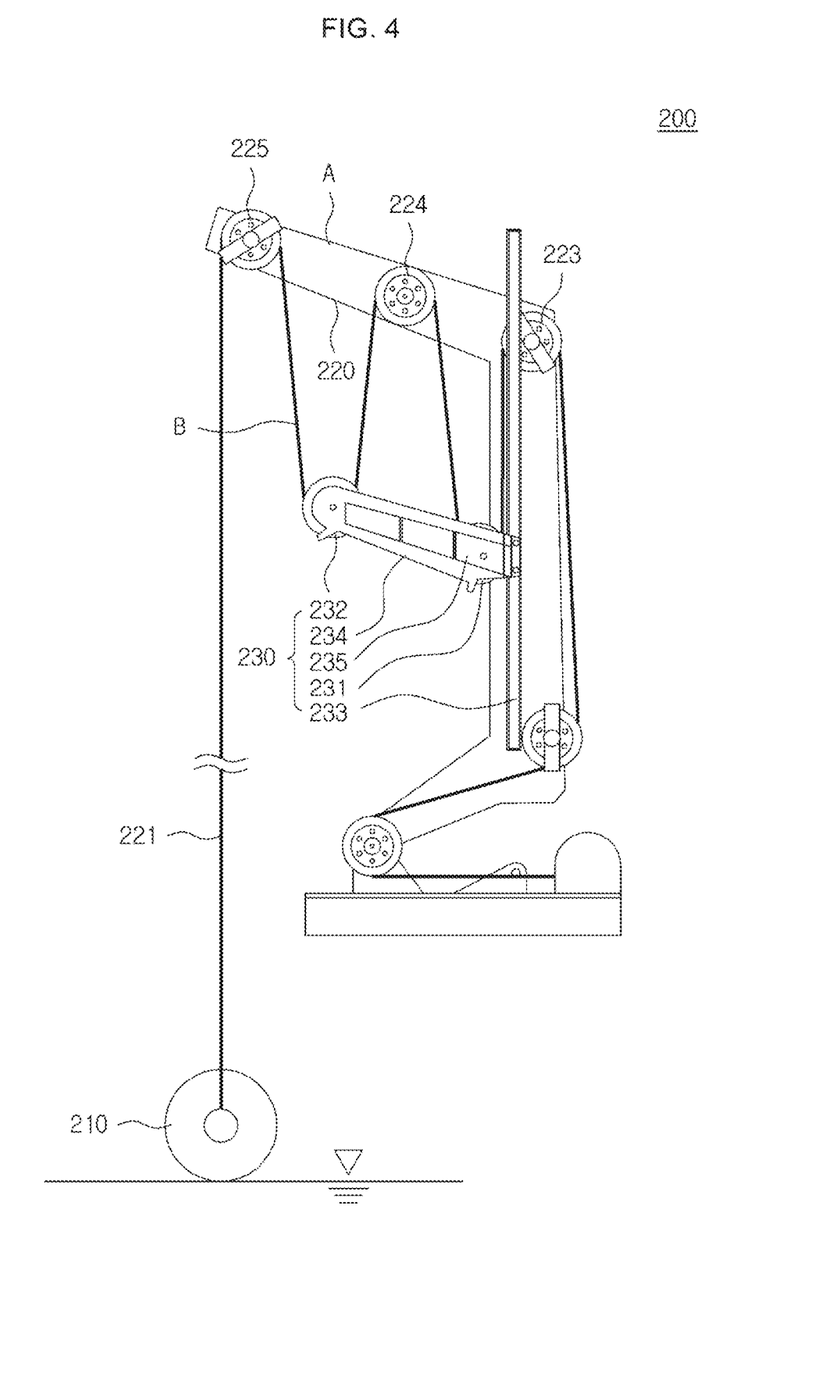
FIG. 4 shows a fender davit device in accordance with another embodiment of the present disclosure.
Figure 5:
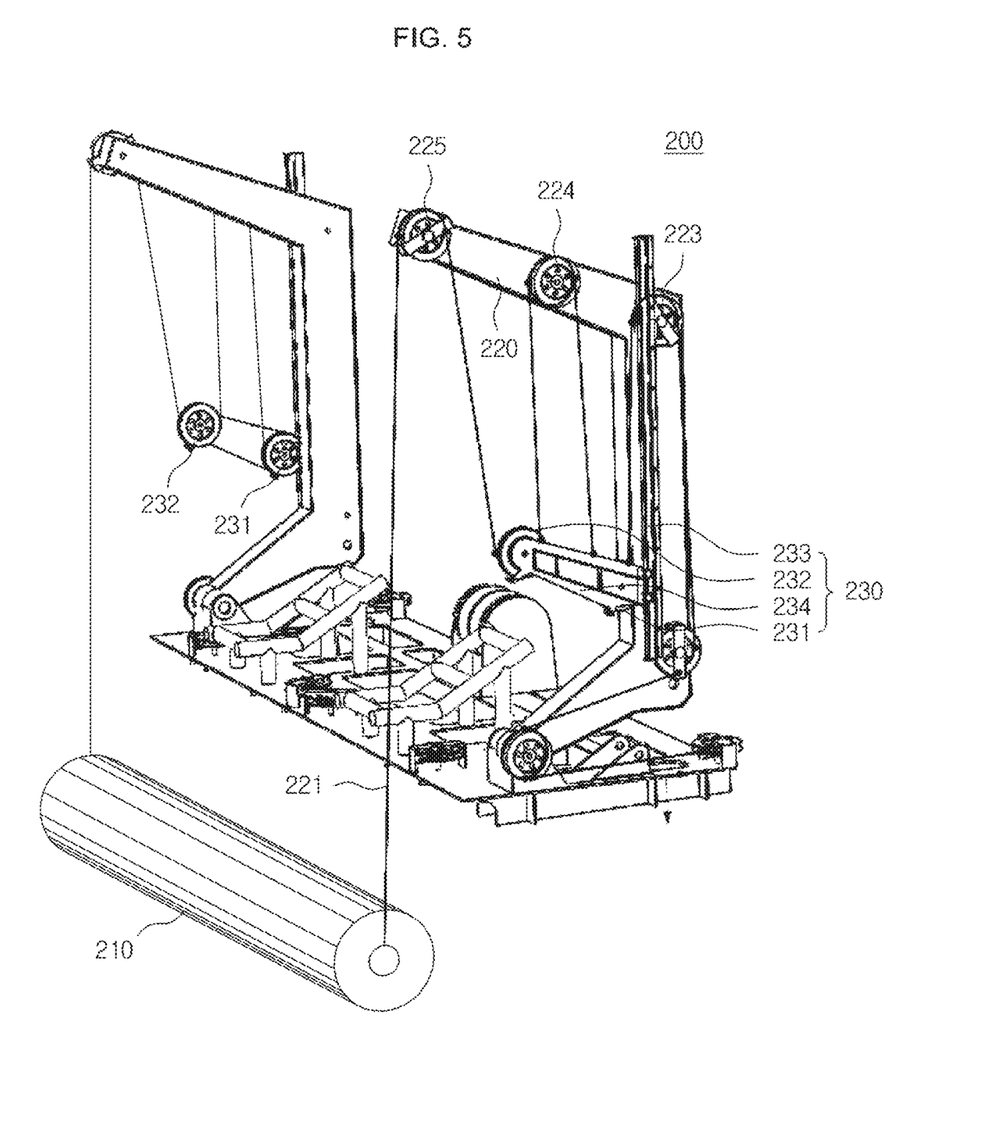
FIG. 5 is a perspective view illustrating how the fender davit device in accordance with another embodiment of the present disclosure works.

FIG. 4 shows a fender davit device in accordance with another embodiment of the present disclosure, and FIG. 5 is a perspective view illustrating how the fender davit device in accordance with another embodiment of the present disclosure works.

Referring to FIG. 4 and FIG. 5, a tender davit device 200 in accordance with another embodiment of the present disclosure includes fender 210, davit 220, and hauling line tension maintaining part 230.

The fender 210 is installed in between two objects (e.g., a vessel and another vessel) and configured to protect side surfaces of the objects by mitigating an impact caused by a contact.

The davit 220 is a structure, such as a crane, for hauling the fender 210. The davit 220 includes a hauling line 221 and a winch (not show as well as a first fixed pulley 223 and a second fixed pulley 224 and may further include a third fixed pulley 225.

The hauling line 221 may be wound on the first fixed pulley 223, the second fixed pulley 224, and the third fixed pulley 225. In such a case, the hauling line 221 is coupled to the fender 210 on one end thereof and to the winch 222 on the other end thereof. Accordingly, the hauling line 221 may be maintained with a tightly pulled state by the weight of the fender 210 (about 16 tons, in this case).

However, as illustrated in FIG. 1, the tension on the hauling line 210 connected to the fender 210 may change from moment to moment according to moving directions of the two objects while the fender 210 is caught in between the two objects and afloat on the water surface. That is, the tension of the hauling line 221 may rapidly increase or may suddenly disappear.

The hauling line tension maintaining part 230 is configured to adjust and maintain the tension of the hauling line 221 within a predetermined range corresponding to a rapid change in tension in the hauling line 221 to prevent the hauling line 221 from breaking, tangling, etc. due to the rapid change in tension.

Figure 6:
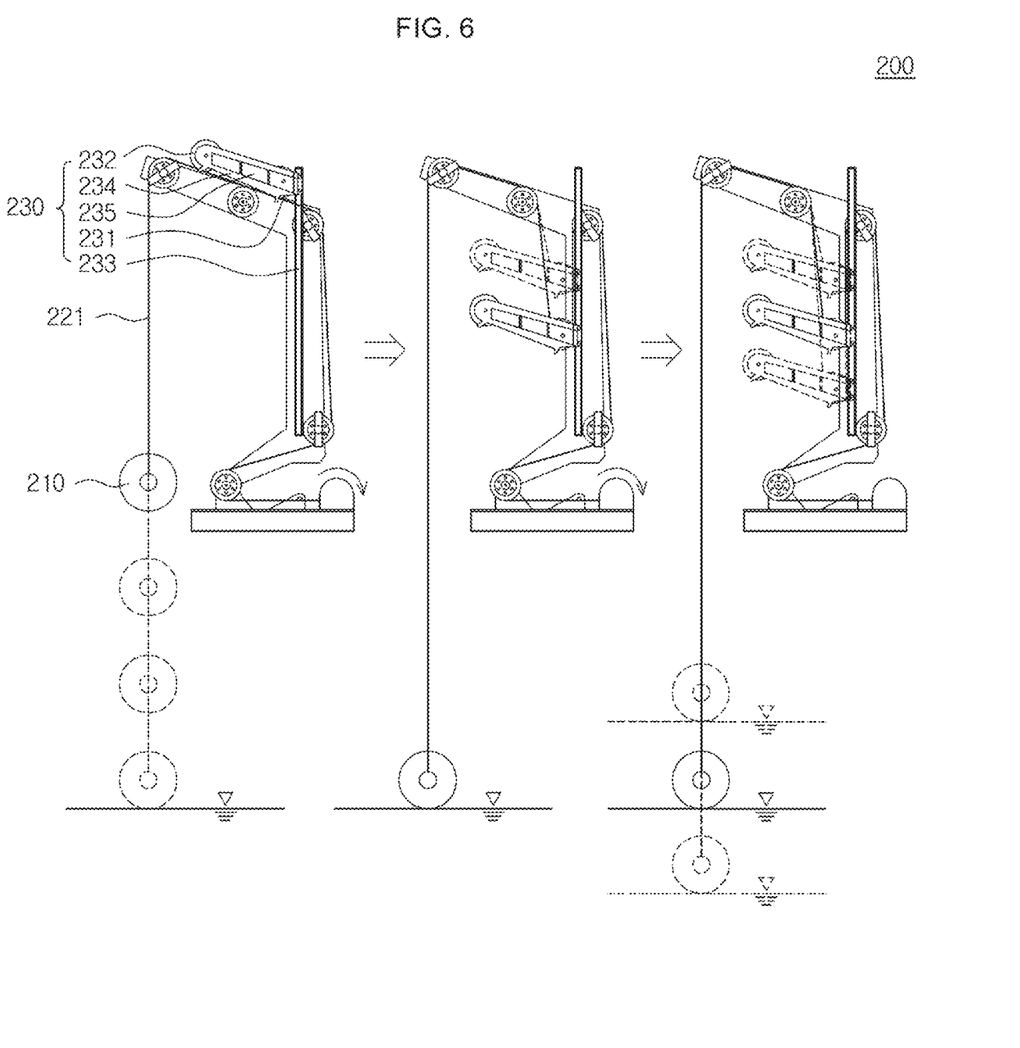
FIG. 6 illustrates how the fender davit device in accordance with another embodiment of the present disclosure works.

FIG. 6 illustrates how the fender davit device in accordance with another embodiment of the present disclosure works. The operation of the fender davit device 200 in accordance with the present embodiment will be described with reference to FIG. 6.

Normally, the fender 210 is received and kept in a cradle. In use, by slightly winding the hauling line 221 through the winch 222, the fender 210 is lifted from the cradle. The lifted fender 210 is then moved to an outside of the vessel, and by releasing the hauling line 221 using the winch 222, the fender 210 may be moved to the water surface, as shown in the left figure of FIG. 6. Here, the weight of the fender is 16 tons, and thus the load applied to the hauling line 221 is also 16 tons. Therefore, the sheave block 234, which is merely 400 kg, is not able to manage the weight of the fender 210 and thus is dragged up to a highest position of the davit 220, as shown in the left figure of FIG. 6.

As shown in the center figure of FIG. 6, when the fender 210 is afloat on the water surface, most of the weight of the fender 210 may be supported by the water surface. Accordingly, by continuing to unwind the hauling line 221, the sheave block 234 may be lowered again, as shown in the center figure of FIG. 1, Once the sheave block 234 reaches approximately the middle of the slider 233, the movement of the sheave block 234 is stopped by stopping the winch 222. In this state, the hauling line tension maintaining part 230 is ready for operation.

In an example, the weight of the sheave block 234 is about 200 kg, and since the hauling line 221 connected to the sheave block 234 has a V-shape, each strand of the hauling line 221 bent in the V-shape is loaded with 100 kg of weight. Therefore, since the total load applied to both strands of the V-shaped hauling line 221 is 200 kg, which is the same as the weight of the 200 kg sheave block 234, a balance may be maintained between the sheave block 234 and the hauling line 221, as shown in the center figure of FIG. 6.

As shown in the right figure of FIG. 6, if the fender moves up or down due to the change in height of the water surface or moves up in between two marine structures, the tension in the hauling line 221 changes. In such a case, the hauling line tension maintaining part 230 moves up or down, as shown in the right figure of FIG. 6, to keep the tension of the hauling line 221 constant.

Specifically, the hauling line tension maintaining part 230 may include first idle pulley 231, sheave block 234, and slider 233.

The first idle pulley 231 is installed in the sheave block 234. The sheave block 234 is slidably installed in the slider 233. The slider 233 enables the sheave block 234 to move.

Specifically, the first idle pulley 231 is wound by the intermediate portion of the hauling line 221 between the fender and the winch. Here, the first idle pulley 231 is installed at a position suitable for pushing down the portion of the hauling line 221 that is between the first fixed pulley 223 and the second fixed pulley 224. Moreover, the sheave block 234 may use its own weight (gravitational force) to pull the first idle pulley 231 downwardly, hence allowing the hauling line 221 to be pulled tightly.

The sheave block 234 moves downwardly by the gravitational force. In other words, since the sheave block 234 has a sufficient weight to restrict the first idle pulley 231 from moving upwardly unless the weight of the fender is suddenly changed, the tension on the hauling line 221 connected to the fender may be maintained at a certain level.

Moreover, the sheave block 234 is slidably installed in the slider 233. Accordingly, if the weight of the fender is suddenly increased, the sheave block 233 may be elevated along the slider 233. That is, by allowing the sheave block 234 to be elevated along the pulled hauling line 221, it is possible to prevent the hauling line 221 from breaking due to an excessive tension.

The slider 233 guides the sheave block 234 for stable ascent and descent. The slider 233 may be, for example, a rail. Accordingly, the first idle pulley 231 and the second idle pulley 232 that hold the hauling line 221 may move up and down along the slider 233 while being coupled to the sheave block 234.

Therefore, the sheave block 234 may maintain a constant tension in the hauling line 221. For example, even if the sheave block 234 is elevated along the slider 233 due to the hauling line 221 being pulled by the fender 210, the hauling line 221 may maintain a tight tension therein due to the weight of the sheave block 234. Moreover, the tension on the hauling line 221 may be lost (i.e., the hauling line becomes loose) when, for example, the fender 210 is raised due to waves or vessel movements while the fender 210 is sitting on the water surface. In such a case, by having the first idle pulley 231 and the second idle pulley 232 pulled downwardly by the weight of the sheave block 234, the loose hauling line 221 may become tight again. Therefore, the hauling line 221 may be prevented from tangling due to the lost tension.

As described above, the fender davit device 200 may prevent the hauling line 221 from breaking, for example, in the situation illustrated in FIG. 1 by adjusting the tension in the hauling line 221 holding the fender 210 to be maintained within a predetermined range through the hauling line tension maintaining part 230, without having to drive a winch (not shown) as has been conventionally.

Figure 7:
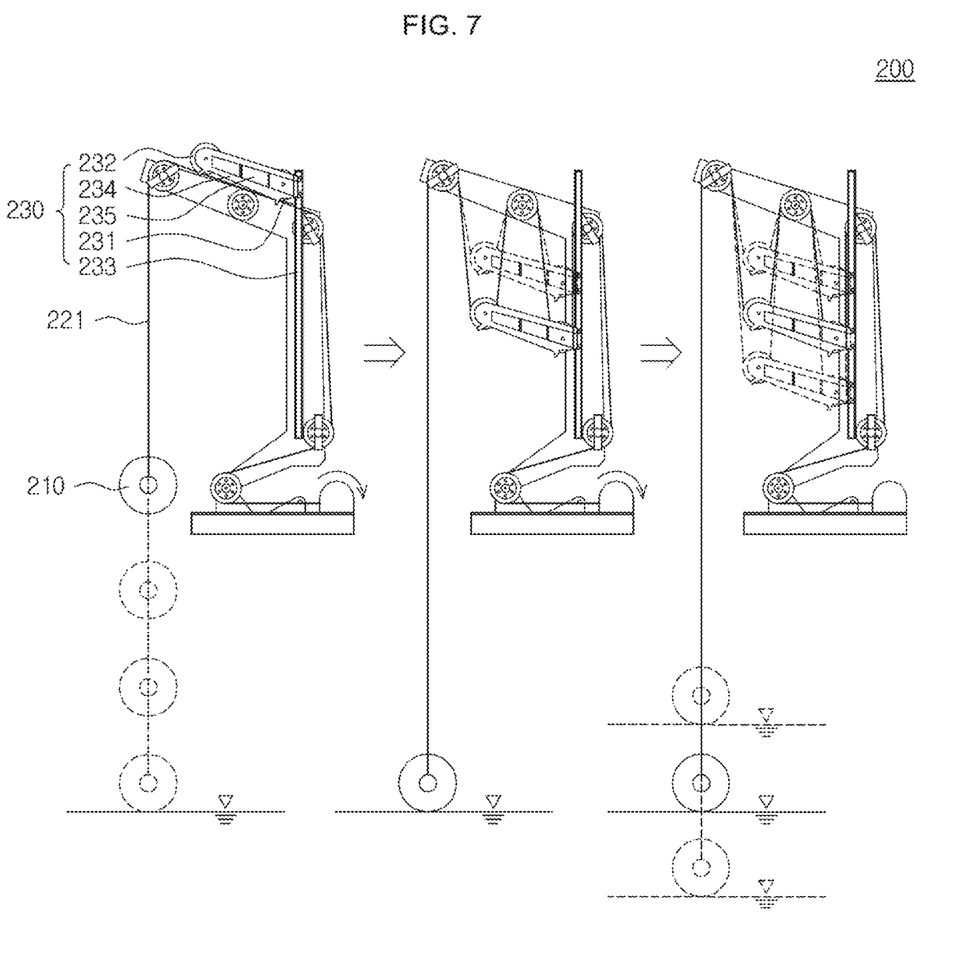
FIG. 7 illustrates how the fender davit device in accordance with another embodiment of the present disclosure works in a modified fashion.

FIG. 7 illustrates how the fender davit device in accordance with another embodiment of the present disclosure works in a modified fashion.

Referring to FIG. 7, the sheave block 234 is additionally installed with second idle pulley 232. The second idle pulley 232 is installed with the first idle pulley 231 in the sheave block 234 so as to be wound by the intermediate portion of the hauling line 221.

Moreover, first fixed pulley 223, second fixed pulley 224, and third fixed pulley 225 are spaced apart in a single line on an upper beam of the davit.

Here, the first idle pulley 231 may be arranged to change the direction of the hauling line 221 wound on the first fixed pulley 223 and the second fixed pulley 224, and the second idle pulley 232 may be arranged to change the direction of the hauling line 221 wound on the second fixed pulley 224 and the third fixed pulley 225.

As a result, the hauling line 221 may be changed from the V-shape of FIG. 6 to a W-shape of FIG. 7. Here, conversion between the V-shape and the W-shape may be implemented by removing or reinstalling the hauling line 221 wound on the first idle pulley 231 or the second idle pulley 232.

As such, according to the present embodiment, the hauling line 221 may be converted from the W-shape to the V-shape or from the V-shape to the W-shape. That is, the length of the hauling line 221 may be varied. By changing the hauling line 221 from the V-shape to the W-shape, the overall length of the hauling line 221 is increased. By lengthening the hauling line 221, it is possible to expand the stroke. For instance, by configuring the hauling line in the V-shape, the fender stroke is multiplied by 2, that is, become twice. By configuring the hauling line 221 in the W-shape, the fender stroke is multiplied by 4, that is, becomes four times.

Meanwhile, if for example the hauling line 221 is changed from the V-shape to the W-shape, the weight of the sheave block 234 that is made with 200 kg needs to be increased. For instance, if the hauling line 211 is changed from the V-shape of FIG. 6 to the W-shape of FIG. 7 with 100 kg of weight applied to each of the 4 strands of the W-shaped hauling line 221, the total weight applied to the 4 strands of the hauling line 221 becomes 400 kg. Therefore, the weight of the sheave block 234 needs to be matched with 400 kg.

For the present embodiment, the weight of the sheave block 234 may be increased through sheave block weight 235 described below.

For example, if the total weight applied to the 4 strands of the hauling line 21 is 400 kg, the weight of the sheave block 234 may be matched with 400 kg by adding 200 kg of the sheave block weight 235 to the 200 kg weight of the sheave block 234. By this, the sheave block 234 and the hauling line 221 may be balanced as shown in the center figure of FIG. 7.

It is of course possible that the sheave block weight 235 is made in a unit of 100 kg and that 2 units of the sheave block weights may be assembled to form 200 kg of sheave block weight.

Figure 8:
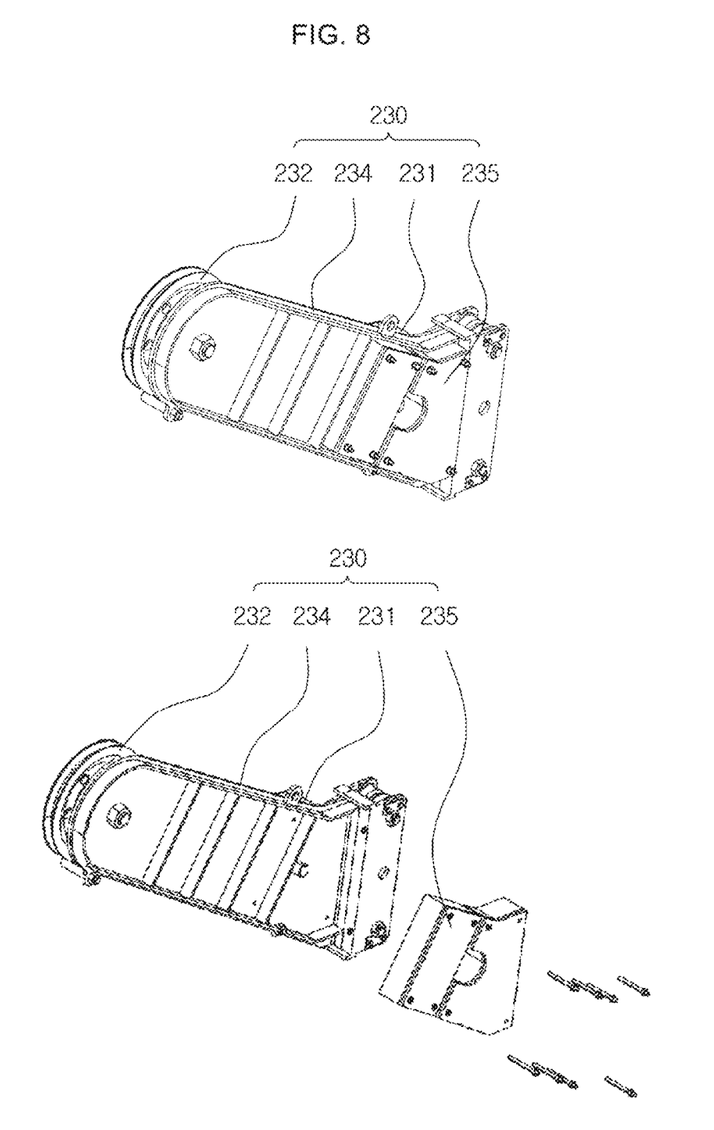
FIG. 8 illustrates a sheave block weight in accordance with another embodiment of the present disclosure.

FIG. 8 illustrates a sheave block weight in accordance with another embodiment of the present disclosure.

Referring to FIG. 8, the hauling line tension maintaining part 230 of the present embodiment may further include the sheave block weight 235.

The sheave block weight 235 is a member for increasing the weight of the sheave block 234 when a situation arises. In other words, the weight of the sheave block 234 may be varied using the sheave block weight 235.

For example, the sheave block weight 235 is configured with units, each having a predetermined weight, and may be detachably coupled to a side surface of the sheave block 234. Moreover, the sheave block weight 235 may be constituted in a detachable structure to incorporate the units as necessary. Accordingly, the weight of the sheave block 234 may be increased or decreased by installing or removing the sheave block weight as much as it is required in the sheave block 234.

Meanwhile, as mentioned above, the hauling line 221 may be separated from the first idle pulley 231 and the second idle pulley 232. Nevertheless, the hauling line 221 being separated while the hauling line tension maintaining part 230 is in operation may lead to a serious accident and thus needs to be prevented.

Figure 9:
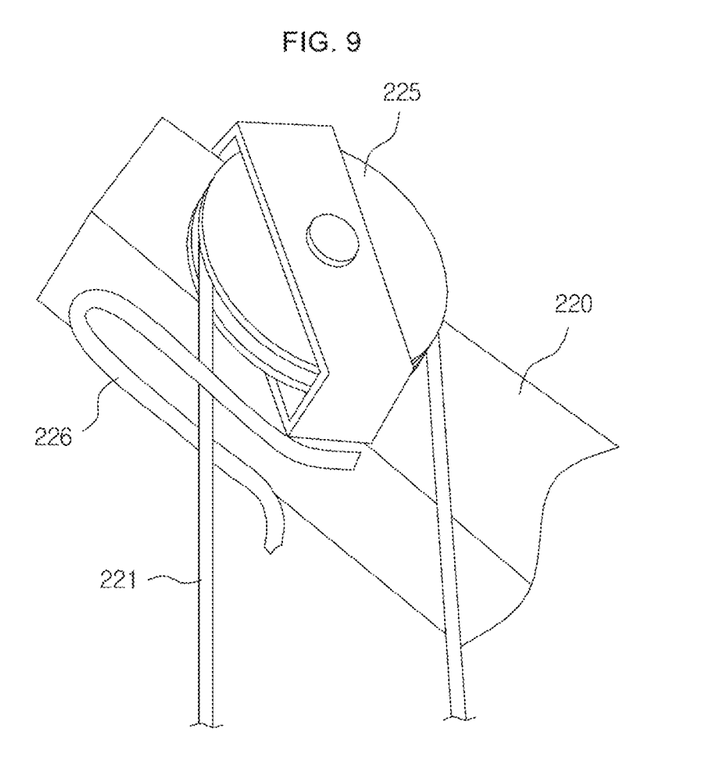
FIG. 9 represents a derail preventing guide in accordance with another embodiment of the present disclosure.
Figure 10:
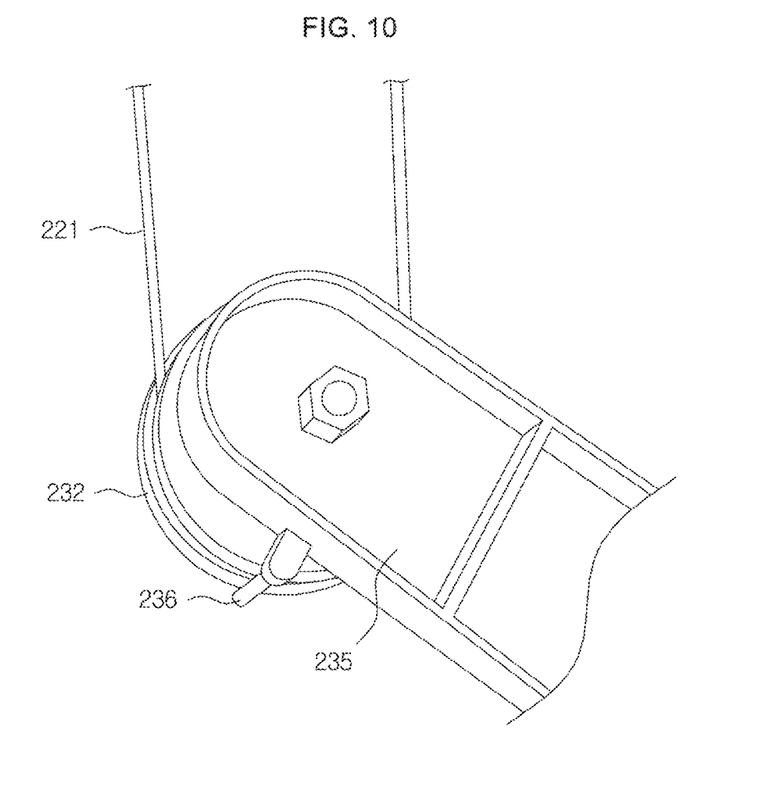
FIG. 10 is a derail preventing pin in accordance with another embodiment of the present disclosure.

FIG. 9 represents a derail preventing guide in accordance with another embodiment of the present disclosure, and FIG. 10 is a derail preventing pin in accordance with another embodiment of the present disclosure.

Referring to FIG. 9, the davit may be additionally installed with a derail preventing guide 226 for preventing the hauling line 221 wound on the first fixed pulley 223 from derailing. The derail preventing guide 226 may be formed in a U-shape. The derail preventing guide 226 is configured to prevent the hauling line 221 from escaping from an allowable range of the first fixed pulley 223 even if the hauling line 221 that is vertically extended downwardly from the first fixed pulley 223 moves in a diagonal direction, rather than in a vertical direction, due to a lateral movement of the fender.

Referring to FIG. 10, the hauling line tension maintaining part 230 may further include a derail preventing pin 236 configured to prevent the hauling line 221 wound on the first idle pulley 231 and the second idle pulley 232 from derailing. The derail preventing pin 236 may be inserted and installed in a hole provided on an outermost circumference of the first idle pulley 231 and the second idle pulley 232.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

INDUSTRIAL APPLICABILITY

According to the present disclosure, it is possible to prevent the hauling line from breaking, for example, in the situation illustrated in FIG. 1 by adjusting the tension in the hauling line holding the fender to be maintained within a predetermined range through the hauling line tension maintaining part, without having to drive a winch.

What is claimed is:

1. A fender davit device, comprising:
 a fender;
 a davit comprising a hauling line holding the fender and a winch configured to move the fender by winding or unwinding the hauling line; and
 a hauling line tension maintaining part configured to maintain a tension of the hauling line holding the fender to prevent the hauling line from breaking, wherein the hauling line tension maintaining part comprises:
a first idle pulley wound at an intermediate portion of the hauling line between the fender and the winch; and
a tensioner connected to the first idle pulley to pull the first idle pulley downwardly with a predetermined strength, and
wherein the tensioner comprises:
a rope being connected to the first idle pulley;
a roller having the rope wound thereon;
a stationary axle penetrating in the roller; and
a spring being arranged between the stationary axle and the roller.

2. The fender davit device of claim 1, wherein the hauling line tension maintaining part further comprises a slider configured to guide a movement of the first idle pulley.

3. The fender davit device of claim 1, wherein the davit comprises a first fixed pulley and a second fixed pulley, and
wherein the first idle pulley is positioned between the first fixed pulley and the second fixed pulley.

4. A fender davit device, comprising:
a fender;
a davit comprising a hauling line holding the fender and a winch configured to move the fender by winding or unwinding the hauling line; and
a hauling line tension maintaining part configured to maintain a tension of the hauling line holding the fender to prevent the hauling line from breaking,
wherein the hauling line tension maintaining part comprises:
a first idle pulley wound at an intermediate portion of the hauling line between the fender and the winch;
a sheave block having the first idle pulley installed therein; and
a slider configured to guide the sheave block to move upward and downward relative to the davit.

5. The fender davit device of claim 4, further comprising a second idle pulley installed in the sheave block to allow the hauling line wound thereon.

6. The fender davit device of claim 5, wherein the davit comprises a first fixed pulley, a second fixed pulley, and a third fixed pulley installed therein,
wherein the first idle pulley is configured to change a direction of the hauling line wound on the first fixed pulley and the second fixed pulley, and
wherein the second idle pulley is configured to change a direction of the hauling line wound on the second fixed pulley and the third fixed pulley.

7. The fender davit device of claim 4, further comprising a sheave block weight detachably installed in the sheave block and configured to adjust a weight of the sheave block corresponding to a load applied to the hauling line.

* * * * *